Feb. 8, 1944.  R. J. HELBERG  2,341,273
CABLE TENSIONING DEVICE
Filed Aug. 5, 1942  3 Sheets-Sheet 1
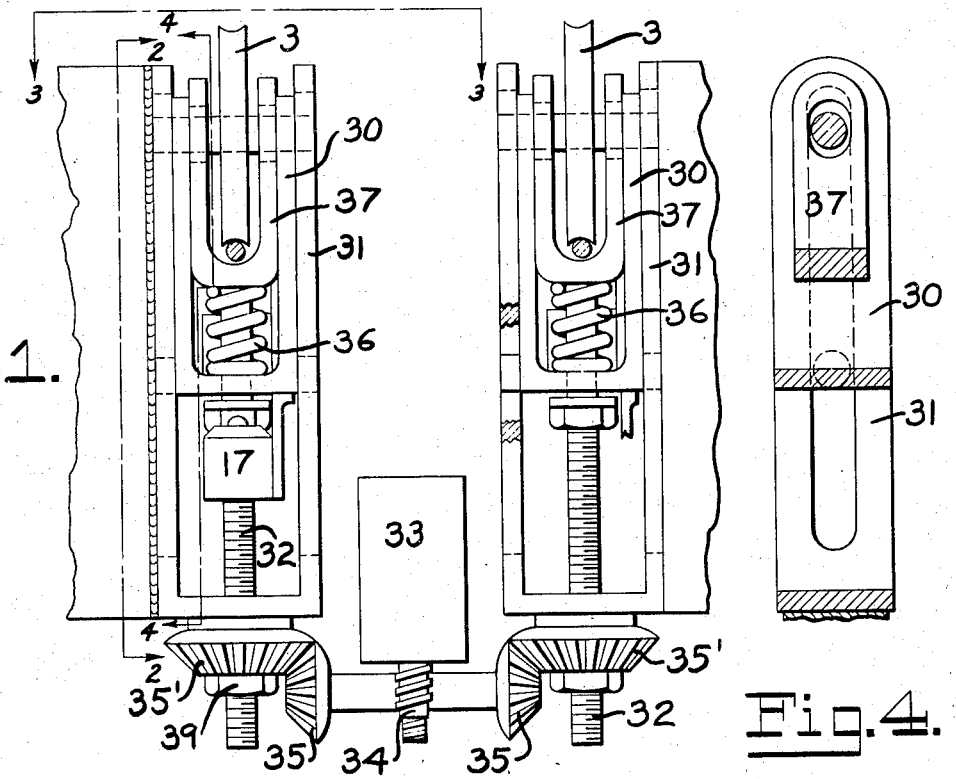
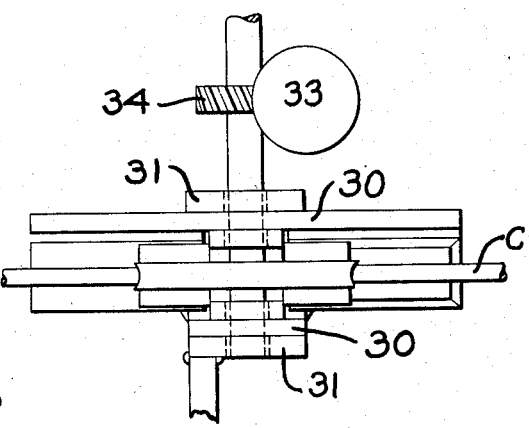
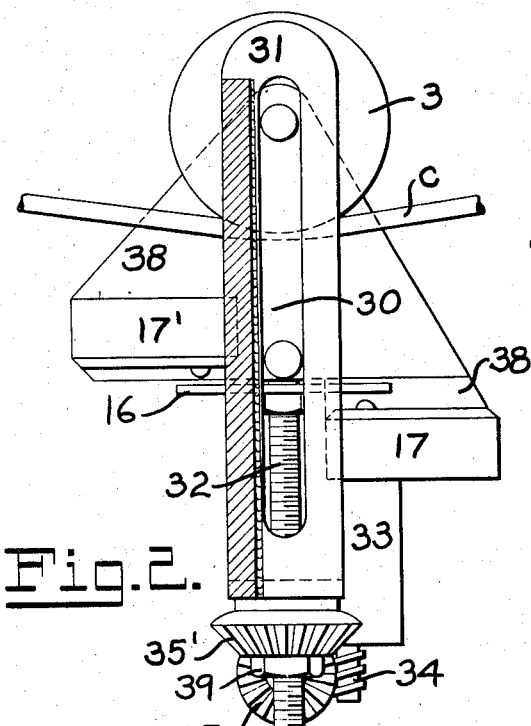
INVENTOR
Robert J. Helberg
BY Reynolds + Beach
ATTORNEYS Feb. 8, 1944.   R. J. HELBERG   2,341,273
CABLE TENSIONING DEVICE
Filed Aug. 5, 1942   3 Sheets-Sheet 2

INVENTOR
Robert J. Helberg
By Reynolds + Beach
ATTORNEYS

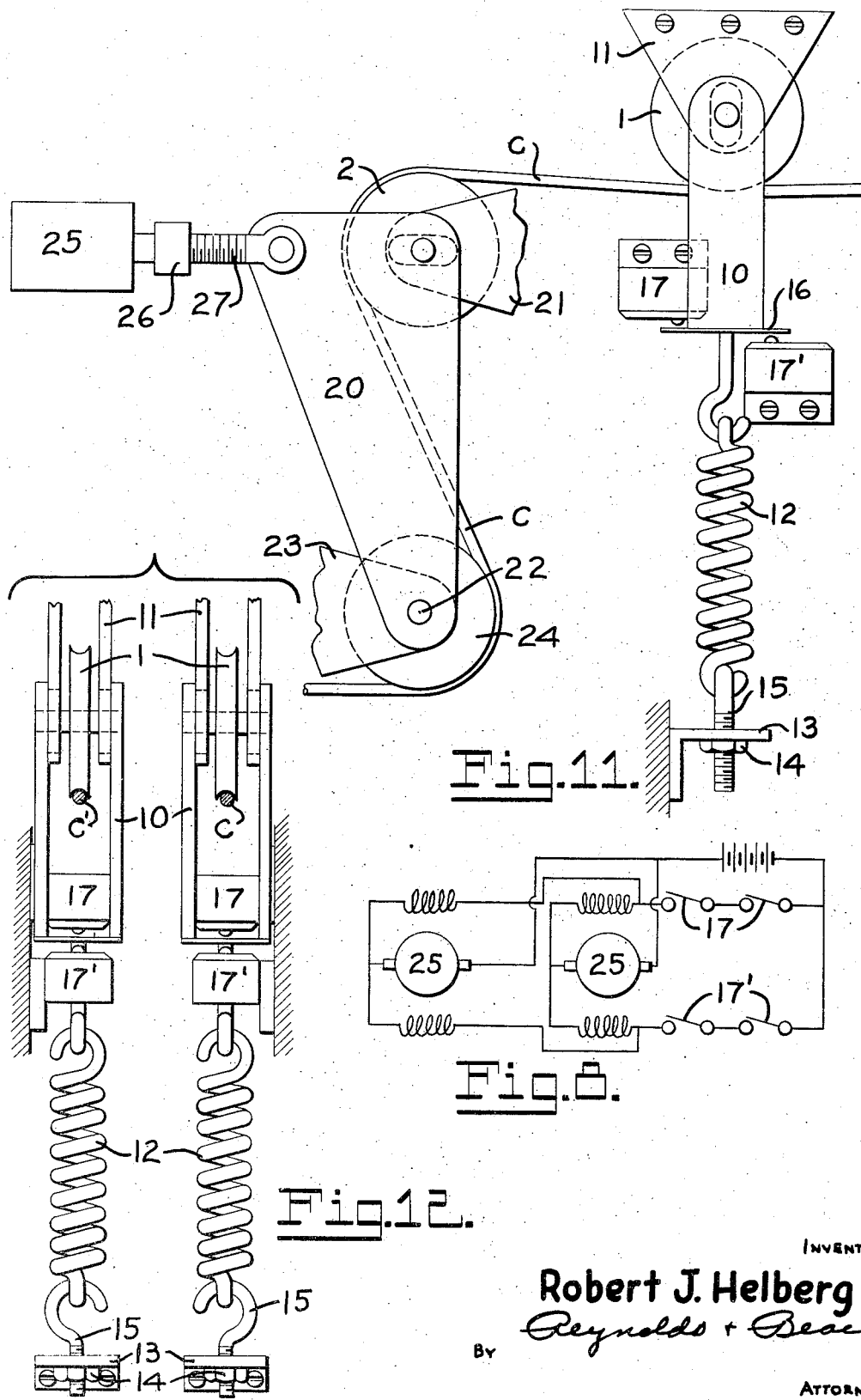

Patented Feb. 8, 1944

2,341,273

UNITED STATES PATENT OFFICE 2,341,273

CABLE TENSIONING DEVICE

Robert J. Helberg, Seattle, Wash., assignor to Boeing Aircraft Company, Seattle, Wash., a corporation of Washington Application August 5, 1942, Serial No. 453,702

16 Claims. (Cl. 74—501)

In cable operated devices it is desirable that the cables be maintained substantially at a predetermined tension. Particularly in systems for controlling aircraft is it necessary to maintain the tension to eliminate any tendency of the control surfaces to flutter, and so that, when an automatic pilot is used the aircraft will not hunt. On the other hand the cables must not be so tight that excessive strain will be placed on them by forces applied to them in controlling the aircraft.

The problem of maintaining proper cable tension is not solved by establishing initially the correct tension, for various factors, particularly temperature changes, may cause expansion or contraction of the cable under different operating conditions. Such temperature changes are drastic in aircraft, for the temperature at sea level may be quite high, perhaps 80° or 90° F., while at altitudes of 35,000 or 40,000 feet, to which the aircraft may climb, the temperature may be 60° or 70° F. below zero. As a result the temperature difference may be more than 150° F. between sea level and the altitude at which the airplane's mission is to be performed.

In order to compensate for the change in tension in control cables or the like under such drastically different temperature conditions, caused either by an absolute change in length, or by different length changes in the cables and in the aircraft structure which houses or guides them, I have devised automatic tension control mechanism which may take various forms, and which may operate on a single cable, but which preferably regulates the tension simultaneously and to the same extent in a plurality of companion cables or cable stretches. In the latter case the tension of neither cable will be altered unless the tension in both changes in the same sense, that is both become tighter or both slacker, and then the tension of both will be varied simultaneously and to the same extent.

Although, as stated above, the tension of two cables may be regulated simultaneously, the tightening mechanism for each is preferably independent of that for the other except as interlocking controls govern both tighteners. For each cable stretch, then, my mechanism includes a control unit sensitive to cable tension and a tightener unit which is governed by the control unit. The control unit may be a pulley which is urged by a spring into engagement with the cable. Initially the tension of the control pulley spring will produce a sag in the cable such that the spring's tension balances the transverse component of the cable tension tending to eliminate such sag. If the cable tension increases the degree of sag will decrease, stretching the spring to place it under greater reaction tension. If the cable tension decreases the relatively greater spring tension will move the pulley toward the cable both to decrease the spring's tension and to increase the degree of sag, thereby increasing the force vector of the cable tension generally transversely of the cable as compared to that perpendicular to the spring.

The transverse movement of the control unit pulley toward or away from the cable, accompanying a decrease or an increase in the cable tension, respectively, and altering the degree of sag, may operate the tightener unit in one direction or the other. Thus if the cable tension decreases so that the sag is increased by the control pulley spring, the tightener drive will operate in a direction to take up the cable, thereby to increase its tension, and to reduce the sag to the initial condition. On the contrary, if the cable tension increases so that the sag decreases and the control pulley spring's tension increases, the tightener drive will operate in a direction to let out the cable, thus to reduce its tension, and allow the control unit spring to draw its pulley back to its initial position.

Where two pairs of control and tightener units are employed, one on each of two companion cable stretches, the two tighteners may be driven by the same or separate drives while the control units may be operatively interlocked so that the pulleys of both must be displaced from neutral position in the same sense before either tightener pulley will be moved. When the control units become effective both tighteners will be operated simultaneously and to the same extent, so that only the smaller variation in cable tension will be completely corrected, if the degree of tension change is different in the two cables. Thus forces exerted unequally on the two cables when a control surface is swung will not operate the tighteners, because while the tension of one cable increases that of the other decreases to a corresponding extent.

My control and tightener units may be constructed and related in different ways, depending to a large extent upon the arrangement of the cables the tensions of which are to be controlled. Thus if the tension of a single cable stretch only is to be regulated considerable latitude of design is possible in the structure employed. If, on the other hand, the tensions of two or more cable stretches are to be regulated simultaneously, one type of mechanism may be necessary if the stretches are very close together, another type of mechanism may be more suitable if the cable stretches are spaced somewhat farther apart, and still another type may be required if the cables are remotely spaced. Also either hydraulic, electric, or other type of tightener drive may be used as may be most suitable for each particular installation, although an electrically operated system is described specifically herein.

The control unit includes a cable pulley journaled in a yoke spring pressed to urge the pulley toward the cable generally transversely of its length. The tightener drive control switches are interposed between a rigid support and the yoke for actuation by appropriate yoke movement. Each tightener unit includes a cable pulley journaled in a yoke movable generally transversely of the cable. This yoke is displaced positively by the tightener drive to increase or to decrease the sag in the cable occasioned by the tightener pulley. As the control unit pulley is moved in one direction by an increase in cable tension the tightener drive will be energized to move the tightener pulley in a direction away from the cable for decreasing the sag at the tightener pulley and increasing it at the control pulley. If the initial cable tension decreases the control unit spring will press the control pulley and yoke toward the cable, effecting energization of the tightener drive to displace the tightener pulley toward the cable, thus increasing the cable sag at such location and increasing its tension to decrease the sag at the control pulley.

Where the tensions of a plurality of cable stretches are to be controlled the tighteners for all cables will preferably be actuated conjointly and equally during each tension adjusting operation. Under such circumstances, if there is some variation in the change of tension in the several cables, the cable whose tension has changed least from its initial tension will govern the tension adjustment in all the cables, so that by such particular adjusting operation only the tension of that cable whose tension changed least will be entirely corrected. If, for example, one cable became too tight while the tension of another decreased, as in a control movement operation, and both cables were slacked off, the cable whose tension was initially correct would now be much too loose. If, then, both cables were taken up to remedy this undertensioned condition of the latter cable, the tighter cable would again be drawn too tight, and this hunting action of both tighteners would persist without being able to correct the tension of both cables. If the initial tension of both cables were restored automatically under such conditions, control forces could not be transmitted by the cables. In order to coordinate the operation of both tighteners, therefore, the tension of both cables must change from their initial tensions in the same sense, that is either both must be tighter or both must be looser than initially to effect operation of the tighteners.

If, on the other hand, the tension of only one cable is to be regulated, or if the proper tension in each individual cable is to be maintained independently of all others, the tightener in each case will be governed directly and solely by the control unit cooperating with the same cable, to maintain its tension exactly. It is therefore an object of my mechanism to control the tension of a single cable independently of the tension of any other cable, when desired. It is a further object, when the tensions of a plurality of cables are to be regulated conjointly, to vary the tensions of all simultaneously and to the same extent in response to the alteration in tension of that cable in which the least change from its initial tension occurs.

It is also an object to control the tensions of a plurality of cooperating cables conjointly, however close together or far apart the corresponding stretches of such cables may be located.

More specifically, where the tensions of a plurality of cables are to be controlled conjointly, it is an object to provide separate but interlocking control units, one for each of the several cables, which control units can be adjusted to maintain or to react to tensions differing in the several cables, if that should be desirable.

My tension regulating mechanism may take different forms, three variations being illustrated in the accompanying drawings. In some types of installation changes in the construction of these devices, without altering the principle of their operation, may be desirable.

Figure 1 is an elevation view of the preferred form of my device, while Figure 2 is a sectional view thereof taken on line 2—2 of Figure 1. Figure 3 is a plan view of one unit of the device, as indicated by line 3—3 of Figure 1. Figure 4 is a vertical section through part of the device, along line 4—4 of Figure 1. Figures 5, 6, and 7 are diagrammatic elevation views corresponding to Figure 1, showing parts in different relative positions.

Figure 8 is a wiring diagram illustrating the method of controlling the tighteners conjointly.

Figure 11 is a side elevation view of still a different form of my invention, while Figure 12 is an end elevation view of the same mechanism.

Figure 5:
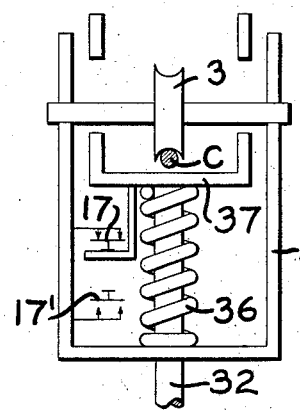

The most compact and preferred type of my device is shown in Figures 1 to 7 inclusive, but the principle of operation will be more easily understood by reference to the modification shown in Figures 11 and 12. This latter form includes a control unit and a tightener unit which are shown in close coupled arrangement, but they may be located any distance apart, since they may be operatively connected by electric wires or fluid conduits, depending upon whether an electric, pneumatic, or hydraulic tightener drive is employed, as may be preferred. In describing the operation of the system an installation employing a reversible electric tightener drive motor will be discussed, but such motor may be replaced by a double acting pneumatic or hydraulic cylinder and piston, and the electric control switches may be replaced by fluid flow reversing control valves, either operated directly by the control unit or by an electric solenoid and switch system.

A control unit pulley 1 and a tightener pulley 2 engage portions of the cable C spaced lengthwise of it. Pulley 1 is carried by a shaft journalled in a yoke 10. The pulley shaft and yoke may be guided for movement generally transversely of the cable length by engagement of the shaft in slots of a suitable stationary bracket 11. The pulley 1 is pressed downward in Figure 11 toward the cable to cause it to sag a greater or less amount by a spring 12 connected by one end to yoke 10, while the force vector of the tension in the sagging cable transversely of its length reacts against and balances the spring's action. While in this instance the spring is illustrated as being of the tension type having its other end secured to a fixed bracket 13, it might be of the compression type and react from bracket 11, since the effect would be the same in either case. The proper relationship between cable tension and sag is established initially by adjustment of nut 14 threaded upon the spring anchor screw 15 extending through bracket 13. With the cable C placed under the proper tension the switch actuator bar 16 may be disposed midway between switches 17 and 17'. If bar 16 is not thus located these switches may be adjusted toward or away from the cable until the bar is midway between them. Furthermore each switch may be moved farther from or closer to bar 16 in order to regulate the latitude in tension change permissible before the cable will be tightened or slackened by movement of pulley 2.

Not only may switches 17 and 17' be moved farther apart or closer together, but after the proper initial tension has been established by adjustment of nut 14, switch 17, controlling slackening of the cable, may be located closer to arm 16 than switch 17' controlling tightening of the cable. Thus if the cable tension should increase only a small amount the mechanism would operate immediately to slacken the cable. On the other hand, the cable might slacken a substantial amount without switch 17' being actuated to effect a take-up operation of the tensioning mechanism.

The shaft of tightener pulley 2 is journaled in a yoke 20 and is guided for movement generally transversely of the cable by slots in a stationary bracket 21 through which it extends. In this particular instance the yoke is swingable about a pivot 22 carried by a second fixed bracket 23, so that the shaft guide slots in bracket 21 should be slightly arcuate in shape to afford free movement of the shaft as the yoke swings. A guide pulley 24 about which the cable runs is also carried by bracket 23. Movement of pulley 2 to the left in Figure 11 tightens cable C, while movement to the right slackens the cable. Such movement is effected when yoke 20 is swung by the operation of reversible motor 25 rotating nut 26 to screw it on or off screw 27 connected to the yoke. The direction of rotation of motor 25 will be determined by which one of switches 17 and 17' is closed. When switch 17 is actuated the motor will rotate in a direction to swing yoke 20 to the right, which moves pulley 2 away from cable C to slacken it. When switch 17' is closed, on the other hand, motor 25 will operate to swing yoke 20 to the left, thus to press pulley 2 toward the cable for tightening it.

It will now be evident that after the tension of spring 12 has been set by nut 14 to exert a sag in cable C corresponding to the tension desired, the neutral or reference position of switches 17 and 17' may be set with respect to switch actuating arm 16 carried by yoke 10. As the cable tension increases the sag in cable C decreases, raising pulley 1, yoke 10, and switch actuating bar 16 to operate switch 17. This causes motor 25 to swing bracket 20 and tightener pulley 2 to the right in Figure 11 to slacken the cable. Spring 12 may now again restore the initial degree of sag in cable C beneath pulley 1, simultaneously drawing yoke 10 and bar 16 down to release switch 17. The operation of motor 25 will then cease, since a spring and cable tension equilibrium has again been reached with the parts of the control unit restored to their initial relative positions.

If the tension of cable C decreases, on the other hand, spring 12 will draw yoke 10 and pulley 1 downward to increase the sag in the cable, and switch actuating arm 16 will operate switch 17'. This action will energize motor 25 to swing yoke 20 and tightener pulley 2 to the left in Figure 11, which will increase the tension in cable C, reducing the sag and lifting pulley 1, yoke 10, and bar 16 to release switch 17'. Motor 25 will thus again be deenergized to leave the parts in their initial condition.

The operation has thus far been described for mechanism applied to a single cable. If the tensions of a plurality of cable stretches are to be regulated by such mechanism, however, a tightener unit for each cable may be used. If there are two cables, as shown in Figure 12, one tightener would be applied to cable C, and the other to cable C'. In addition it is preferable to use a control unit for each cable, although both tighteners might be governed by only one control unit responsive to the tension in a single cable. Since the tighteners engage the cables quite independently of each other, this apparatus may be used no matter how far apart the cable stretches may be. Where a control unit also is applied to each cable, it is desirable to interlock the two control units so that the drive motors 25 for the two tighteners will be operated in unison, but only upon a change in tension in both cables in the same sense. Thus if control forces increase the tension of one cable above its initial tension and the tension of the other cable decreases correspondingly, the tightener for neither cable will be operated, for otherwise the force exerted to swing the control surface would be compensated and it would not be swung. To accomplish this operation the motors may be connected in parallel, the two switches 17 being connected in series with one field of both motors and switches 17' being connected in series with the reversing fields of both motors. Only when both switches 17 or 17' are closed, therefore, will either motor operate, and then they will both rotate simultaneously in the same direction. Figure 8 illustrates a circuit diagram of this type.

In the preferred form of my mechanism shown in Figures 1 to 4, inclusive, the control and tightener mechanisms are combined, so that only a single pulley engages each cable and serves the dual purpose of a tightener and an actuator for the tightener drive. The shaft carrying pulley 3 is journaled in a yoke 30, which in this instance is guided to slide relative to a fixed bracket 31 by the ends of the pulley shaft being received in slots extending transversely of the cable. Yoke 30 is not connected positively to the tension adjusting rod or screw 32, which may be moved endwise by motor 33 operating through a suitable drive, such as a worm and wheel 34 and bevel gears 35. Instead yoke 30 is positioned resiliently between spring 36 reacting between an inner yoke 37 and yoke 30, on the one hand, and the transverse force vector of the tension in cable C on the other hand. As shown in Figure 1, the cable tension acting upward on pulley 3 tends to raise yoke 30 relative to bracket 31, whereas spring 36 tends to force yoke 30 downward relative to yoke 37 and screw 32. Relative movement of these two yokes is permitted despite the pulley shaft being journaled in yoke 30 by providing slots in yoke 37 through which the pulley shaft extends.

Floating yoke 30 carries switches 17 and 17' on wings 38, which may be actuated by engagement with bar 16 mounted on screw 32. These switches may be adjustable initially relative to their supporting wings, in order to space them farther apart or closer together, or in a different relationship relative to switch actuating bar 16, as described in connection with the form shown in Figures 11 and 12.

Figure 6:
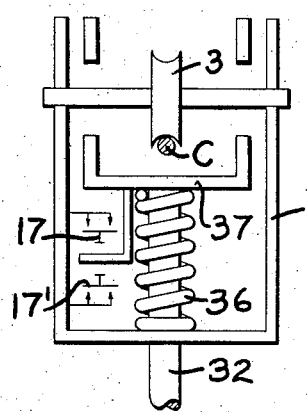
Figure 7:
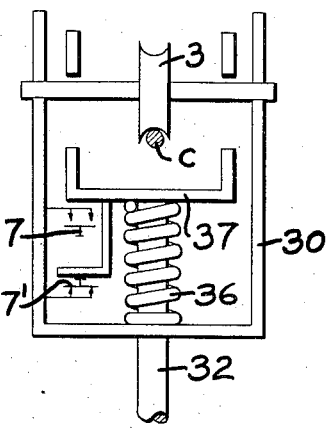

The operation of this type of device, if used for regulating the tension of a single cable, is quite similar to that of the form described in Figure 11, except that in this instance switches 17 and 17' move, whereas actuating bar 16 remains stationary. Various phases of the operation are shown in Figures 5, 6 and 7. If desired, of course, the mounting of switches 17, 17' and bar 16 might be reversed, so that in this instance also the switches would remain stationary and bar 16 would move.

The principle of operation of this device and the manner in which it is adjusted initially are generally the same as described previously. Bevel gear 35' may be slidably keyed to screw 32 and have locked to it a nut 39 in the proper relationship to establish the desired initial tension in cable C. Thus as nut 39 is screwed onto screw 32 the screw and yoke 37 will be drawn downward, which will tend to increase the tension of spring 36, thereby moving yoke 30 downward to increase the cable sag and establish a higher tension in cable C to balance the spring. When the tension of spring 36 with relation to the tension and degree of sag of cable C has been established, nut 39 will be locked to bevel gear 35' to rotate with it. Instead of rotating nut 39 relative to gear 35' initially the tension of spring 36 may be set by rotating motor 33 to drive the bevel gears, if suitable manual motor controls are provided.

With the spring tension thus established, the relative location of yokes 30 and 37 will be determined. The spacing between switches 17 and 17' may then be set, and switch actuating bar 16 may be located properly with respect to them either by such switch adjustments or by securing bar 16 to screw 32 in a different location. The initial relative positions of the parts after such adjustment has been made is shown somewhat diagrammatically in Figure 6.

An increase in the tension of cable C will raise pulley 3 and yoke 30 against the tension of spring 36 as shown in Figure 7. Yoke 37 cannot be raised by the spring, however, because it is held down positively by screw 32 threaded in nut 39, which reacts through bevel gear 35' to fixed bracket 31. Such actuating bar 16 therefore remains stationary, while switch 17 is raised by the upward movement of its supporting wing 38 projecting from yoke 30. As switch 17 is engaged with bar 16 motor 33 will be energized to rotate the bevel gears and nut 39 in a direction to raise yoke 37. This will relieve spring 36, so that the tension of cable C will slide yoke 30 upward in bracket 31, tending to follow up the upward movement of yoke 37. Such upward movement of yoke 30 and pulley 3 will decrease the sag in cable C and slacken it, so that the lesser cable tension will be in balance with the new tension of relieved spring 36.

During this operation yoke 30 will not rise as much as yoke 37 and switch actuating bar 16 so the latter will have been lifted above switch 17 and they will no longer be in operative engagement. Consequently motor 33 will stop operating, the initial tension of the cable having been restored with the pulley 3, yokes 30 and 37, spring 36, bar 16, and switches 17 and 17' in their original relationship. All these parts, however, will have been shifted upward with respect to stationary bracket 31 by rotation of nut 39 relative to screw 32. The amount of sag in cable C will be less, although its tension is again the same as it was initially.

If, on the other hand, the tension of cable C tends to decrease, such as may be caused by an increase in temperature, its tension will no longer offset that of spring 36, and its reaction will force yoke 30 downward to increase the sag in the cable, as illustrated diagrammatically in Figure 5. Simultaneously switch 17' carried by yoke 30 will be pressed downward into engagement with switch actuating bar 16. Closing of this switch will energize motor 33 to rotate in the opposite direction for drawing the screw 32 downward by rotation of nut 39 by the bevel gears 35, 35'. Yoke 37 will also be drawn downward by this action, tending to increase the tension of spring 36, to urge yoke 30 downward still farther. Such movement will increase the sag in cable C, and also tighten it, so that again an equilibrium condition will be reached between the transverse force vector of the tension in the cable and the tension of spring 36. Such tensioning of the spring will reduce the downward movement of yoke 30 as compared to that of yoke 37, so that the switch actuating bar 16 will move away from switch 17' to stop motor 33 with the parts in a new position of equilibrium. In such position the sag in cable C will be greater, but its tension will be substantially the same, and screw 32, yoke 30, yoke 37, and spring 36 will all be in substantially the same relationship, but will be displaced downward relative to stationary bracket 31 from their initial locations.

As with the type of device illustrated in Figures 11 and 12, it will be evident that this form also is well adapted to regulate the tension of a single cable, but it may be operated alternatively to control simultaneously the tension of two cooperating cables which may either be located side by side or some distance apart. If the cables are widely separated, two tightener motors may be required, and the control switches and motors will be connected to operate both motors simultaneously, as shown in Figure 8. If the cables are relatively close together a single motor may be connected to drive both units, as shown in Figure 1, the switches 17 and 17' still being connected as shown in Figure 8. In this instance the two gears 35 are shown mounted upon a common rigid shaft, but this shaft may be replaced by flexible drives if the units cannot be located in corresponding relationship adjacent to each other in the manner shown. Alternatively the rods 32 may be reciprocated by some other type of positive driving mechanism.

As previously described both cables must become slacker or both tighter than initially in order for the motor to operate at all. When such operation is initiated, either to tighten or to slacken the cables, as the case may be, the tension will be changed in both simultaneously by movement of yokes 37 to the same extent until one of the cables has been restored to its initial tension condition. Motor 33 will thereupon be deenergized and will remain inoperative until the tension in both cables again changes in the same sense.

If the cables are located close alongside each other it will be evident that there would be insufficient space for the installation of either the arrangement of Figure 1 or of Figure 12. In such event, the modification shown in Figures 9 and 10 may be employed. Both the control unit and the tightener unit have dual pulleys mounted on common shafts, one pulley of each unit being engaged by one cable C, and the other pulley being engaged by the other cable C'.

The control unit is constructed quite similarly to that shown in Figure 11, and operates on the same principle. In this instance the common shaft upon which the two pulleys 1 are mounted is journaled in a relatively wide yoke 18. The shaft also extends through slots in fixed bracket 11, guiding the shaft for movement toward or away from the cable C. As in the structure of Figure 11, the switch actuating plate 16 is carried by the pulley journal yoke, and cooperates with switches 17 and 17', respectively. The tension of spring 12, interconnected between yoke 18 and fixed bracket 13, may be adjusted by screwing nut 14 along screw 15, so that it will balance the joint tension of both cables C and C' when 16 is located in the desired position between switches 17 and 17'. As previously explained, the location of these switches may be adjusted initially to afford the desired type of control.

Figures 9, 10:
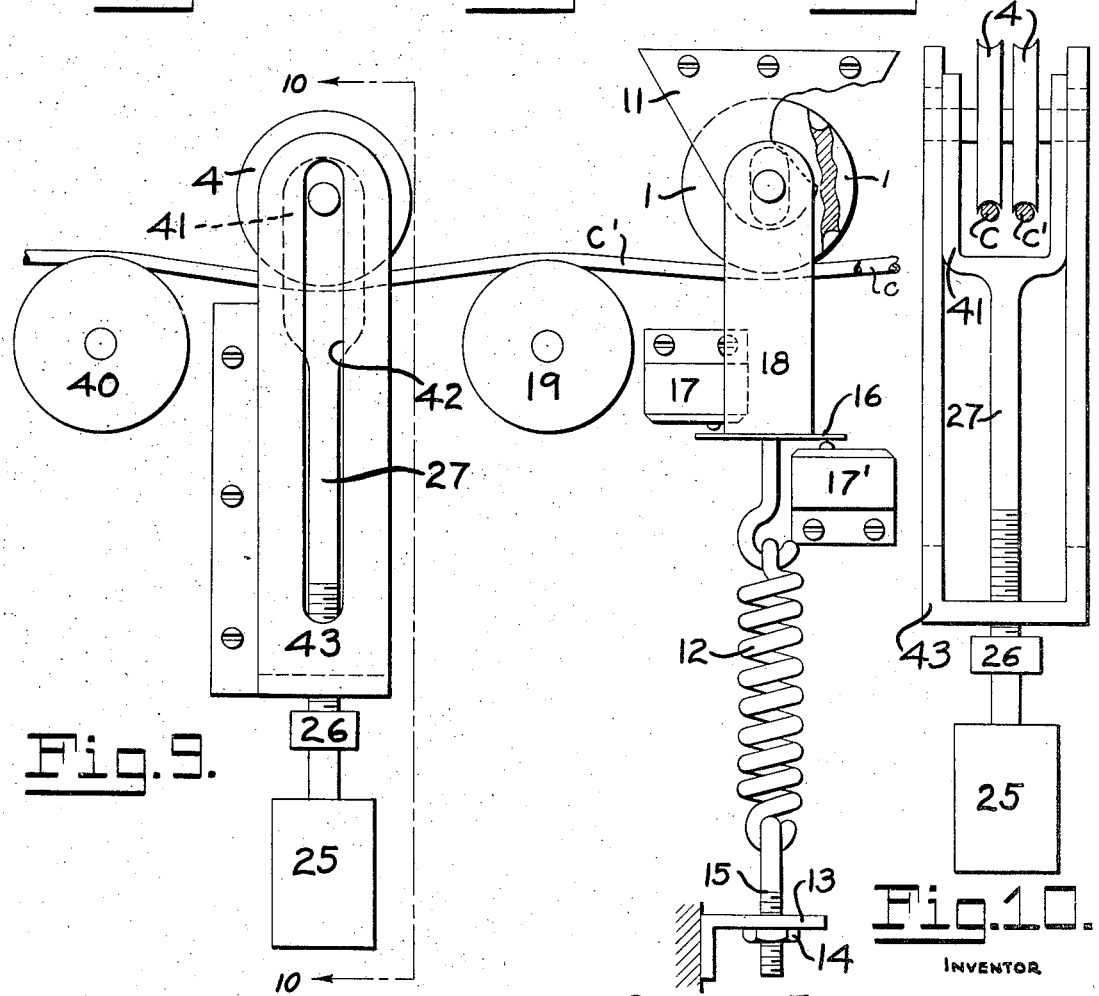
Figure 9 is a side elevation view of a different form of my device.
Figure 10 is a sectional view of this device on line 10—10 of Figure 9.

The tightening unit is somewhat different from that of Figure 11, since the pulleys 4 are movable in a path parallel rather than generally perpendicular to that of pulleys 1. Consequently fixed idler pulleys 19 should be located between the control and tightener units. Any sag produced in the cables by pulleys 4 will therefore be between such fixed idler pulleys 19 and a second set of fixed idler pulleys 40 on the side of pulleys 4 opposite pulleys 19. Tightener pulleys 4 are mounted on a common shaft which is journaled in a yoke 41, as shown in Figure 10. The ends of this shaft project beyond the opposite sides of the yoke, and are guided for movement toward or away from cables C and C' transversely thereof by guide slots 42 in a stationary U-shaped bracket 43. The yoke 41 is moved as described in connection with the device of Figures 11 and 12 by a nut 26 rotated by a motor 25 and threaded on a screw 27 integral with yoke 41.

In this type of device only one set of switches 17, 17' is required, and only one tightener drive motor 25 is needed. Consequently the series connection of switches shown in the diagram of Figure 8 will not be used, but the effect of the mechanism will be substantially the same. Switch 17' cannot be closed unless the joint tension of both cables C and C' decreases. In such event, of course, yoke 41 will be driven downward to increase the sag between pulleys 19 and 40, thereby to increase the tension of both cables. Conversely, an increase in the joint tension of both cables will close switch 17 to effect upward movement of yoke 41. If the tension of one cable increases to the same extent that of the other decreases, as in a control moving operation, neither switch will close because the aggregate tension of both cables remains the same. Although in the other types of device described the tension of both cables must change in the same sense, either increase or decrease, before either cable would be slackened, it is possible here that a change in tension of only one cable, if sufficiently drastic, might operate either switch 17 or 17'. Ordinarily the discrepancy in tension between the two cables would be insufficient in an installation of this type to effect this operation, but if there were a reasonable possibility of such a condition occurring switches 17 and 17' might be set somewhat farther apart than such switches would be set in the device of Figure 11, to render the control less sensitive.

As previously explained, the stress of the control unit spring is balanced by the transverse force vector of the cable tension. Consequently if the cable tension increases the tightener will be energized to slack off the cable. The same effect would be present if the spring stress decreased instead of the cable tension increasing, such as would be caused by the spring breaking. Normally the result would be that the tightener would be energized to slack off the cable indefinitely, which would render the aircraft controls inoperative. In order to forestall such operation of my automatic tension regulator an emergency tightener control may be provided.

In order to establish the proper setting of the emergency control the minimum permissible tension of the cable must be determined. In the device of Figure 11, then, brackets 21 may be located initially, or, if desirable, may be adjusted to the position such that, when the axle of pulley 2 reaches the right end of the bracket's slot, cable C will be at the minimum permissible tension under the most extreme conditions which will be encountered. If spring 12 should break the cable tension would close switch 17, as previously explained, and motor 25 would be energized to swing yoke 20 and pulley 2 to the right. When the shaft of pulley 2 contacts the right end of the slot in bracket 21, however, the parts will jam, motor 25 will be overloaded, and its fuse will be blown or circuit breaker operated to stop its further operation despite maintenance of switch 17 in the closed position. Instead of disposing bracket 21 to limit the movement of the pulley axle any other suitable mechanical limit between the movement of nut 26 and screw 27 may be substituted so long as it has the dual effect of terminating movement of pulley 2 in a limiting position and deenergizing motor 25.

Precisely the same type of operation may be achieved by the other devices described. In the modification of Figure 9, for example, bracket 43 may be located or adjusted so that when the cable has been let out as far as desired upon breakage of spring 12 the axle of pulleys 4 will engage the upper end of slot 42 in bracket 43. This again will overload motor 25 and prevent further slackening of the cable.

In the device of Figures 1 and 2 also bracket 31 may be located so that the shaft of pulley 3 will engage the upper end of the bracket slot as seen in Figure 2 to arrest cable slackening movement of the pulley when spring 36 breaks. Such engagement will also limit outward movement of yoke 30 so that yoke 37 will be driven outward relative to it in such event to release switch 17' for stopping the motor. An expedient for more easily adjusting the limiting outward position of pulley 3 is to thread bevel gear 35' on screw 32, and instead of locking nut 39 to the bevel gear, as previously described, lock it to screw 32 in accordance with the limiting upward position of such screw desired. In such instance the initial position of yoke 37 will be established by rotation of bevel gear 35', which will always be in engagement with the bottom of bracket 31. If spring 36 should now break, causing switch 17' to be closed to energize motor 33, screw 32 would be moved upward only until nut 39 jammed against bevel gear 35', whereupon the motor would be overloaded and would be deenergized by blowing of a fuse or operation of a circuit breaker.

At the very worst, therefore, even though the control unit spring should break, the cables would be no looser than would be necessary if no regulator at all were provided, for in such case the cables must be sufficiently loose so that under the most extreme conditions of stretch the cable tension will not be greater than safely permissible.

What I claim as my invention is:

1. A cable tension regulator comprising control means including a pulley engaging the cable, a yoke in which said pulley is journaled, means urging said yoke in a direction to press said pulley against the cable to produce a sag therein, a stationary support, and switch means cooperating between said support and said yoke for energization by said yoke upon movement thereof relative to said support in response to a change in cable tension, tightener means for the cable, and tightener drive means operated upon energization of said switch means to drive said tightener means, thereby tending to restore the initial tension of the cable to enable said switch means to return to its original relationship to the yoke and support.

2. A cable tension regulator comprising control means including a pulley engaging the cable, a yoke in which said pulley is journaled, means urging said yoke in a direction to press said pulley against the cable to produce a sag therein, a stationary support, and reversing switch means cooperating between said support and said yoke for energization by said yoke upon movement thereof relative to said support in either direction generally transversely of the cable from its initial position, in response to a change in cable tension, tightener means for the cable, and tightener drive means operated upon energization of said reversing switch means to drive said tightener means, thereby tending to restore the initial tension of the cable to enable said switch means to return to its original relationship to the yoke and support.

3. A cable tension regulator comprising a pulley engaging the cable, a yoke in which said pulley is journaled, a reaction member, means interposed between said yoke and said reaction member and urging the yoke in a direction to press the pulley against the cable, drive means operable to increase the force exerted by said first means, and means operable upon movement of said yoke to energize said drive means for thus increasing the force of said first means.

4. A cable tension regulator comprising a pulley engaging the cable, a yoke in which said pulley is journaled, a reaction member, a spring interposed between said yoke and said reaction member and urging the yoke in a direction to press the pulley against the cable, drive means operable to move said reaction member positively, to tend to increase the stress in said spring, and means operable upon movement of said yoke to energize said drive means for thus moving said reaction member.

5. A cable tension regulator comprising a pulley engaging the cable, a yoke in which said pulley is journaled, a reaction member, a spring interposed between said yoke and said reaction member and urging said yoke in a direction to press said pulley against the cable, switch means and switch operating means, one of said means being movable with said yoke and the other being carried by said reaction member, and means energizable upon operation of said switch means upon relative movement of said yoke and said reaction member in response to a change in cable tension to restore the initial cable tension.

6. A cable tension regulator comprising a pulley engaging the cable, a yoke in which said pulley is journaled, a reaction member, a spring interposed between said yoke and said reaction member and urging said yoke in a direction to press said pulley against the cable, switch means and switch operating means, one of said means being movable with said yoke and the other being carried by said reaction member, and drive means energizable upon operation of said switch means upon relative movement of said yoke and said reaction member in response to a change in cable tension to move said reaction member for changing the stress in said spring, thereby to shift said pulley and consequently to restore the initial cable tension.

7. A cable tension regulator comprising a pulley engaging the cable, a yoke in which said pulley is journaled, and spaced from said pulley, a reaction member interposed between said yoke and said pulley and including a rod integral therewith and extending generally in the plane of said pulley in a direction away from the pulley and through said yoke, a compression spring encircling said rod and tending to force said yoke and reaction member apart, thereby to press said pulley against the cable, and means operable to shift said rod lengthwise for moving said reaction member, thereby tending to alter the spacing between said yoke and said reaction member, and consequently changing the stress in said spring.

8. A cable tension regulator comprising a pulley engaging the cable, an axle on which said pulley is mounted, a yoke in which said pulley axle is journaled, a second yoke interposed between said first yoke and said pulley and having therein slots through which said pulley axle extends, a rod integral with said second yoke and extending through said first yoke in a direction substantially diametrically of said pulley but directed away therefrom, a spring encircling said rod and reacting between said yokes, tending to urge the first yoke in a direction to press said pulley against the cable, switch means interposed between said two yokes and operable thereby upon relative movement thereof in response to a change in cable tension, and drive means energizable upon closing of said switch means, and thereupon operable to reciprocate said rod in a direction tending to effect relative movement of said yokes to permit opening of said switch means.

9. A cable tension regulator, comprising a cable-engaging member, spring means normally exerting a force on said cable-engaging member sufficient to dispose said member in a predetermined position holding the cable deflected in opposition to the cable tension, and tightener means operable, upon movement of said cable-engaging member away from such predetermined position effected by variation in the cable tension, to take up or to slacken the cable as required to return said cable-engaging member to such predetermined position.

10. A cable tension regulator comprising a pulley engaging the cable, a yoke in which said pulley is journaled, a reaction member, a spring reacting between said yoke and said reaction member urging said yoke generally transversely of the cable engaged by said pulley to deflect the cable in opposition to the cable tension, a tightener movable to effect a cable slackening operation, tightener drive means operable upon movement of said pulley accompanying a decrease in such cable deflection to effect such movement of said tightener, and limit means directly engageable by said tightener upon predetermined movement by said tightener drive means, operable to terminate movement of said tightener in an established limiting position irrespective of the stress in said spring.

11. A cable tension regulator for a plurality of companion cables, comprising tightener means operable to vary the tension of all the cables simultaneously, a control member for each cable, each movable in response to a change in tension in its cable irrespective of movement of any other control member, and drive means for said tightener means controlled jointly by said control members, and energizable only upon independent movement of all said control members responsive to either an increase above or a decrease below the respective initial tensions of all the cables.

12. A cable tension regulator for a plurality of companion cables, comprising tightener means operable to vary the tension of all the cables simultaneously, a control pulley for each cable, a spring for each pulley to urge the same toward its respective cable, and drive means for said tightener means energizable only upon independent movement of all said pulleys responsive to either an increase above or a decrease below the respective initial tensions of all the cables.

13. A cable tension regulator for two companion cables, comprising a control member movable by a change in tension of one cable, a separate control member independently movable by a change in tension of the other cable, tightener means for said two cables, tightener drive means for said tightener means, and means operable upon movement of both said control means in the same sense, either by an increase in tension of both cables or by a decrease in tension of both cables, to energize said tightener drive means for operating said tightener means either to take up both cables or to let out both cables, depending upon the sense in which said two control members both moved, but inoperative to energize said tightener drive means by a change in tension of one cable only.

14. A cable tension regulator for two companion cables, comprising a control unit for each cable including a cable engaging pulley, a yoke in which said pulley is journaled, spring means acting upon said yoke to press said pulley against said cable for producing a sag therein, and a switch closable upon movement of said pulley in opposition to said spring means, produced by an increase in cable tension, tightener means, and a tightener drive motor energizable to move said tightener means in a direction to slacken the cable only upon the closing of said switches in both control units.

15. A cable regulator for a pair of companion cables in side by side relationship, comprising two parallel pulleys each adapted for engagement with one cable, an axle on which both of said pulleys are mounted, a yoke in which said axle is journaled, and means urging said yoke in a direction to press said pulleys against their respective cables, and exerting a force on said yoke sufficient to balance the transverse force vectors of the tensions in both cables, tightener means operating simultaneously upon both cables, and means operable upon movement of said yoke in a direction generally transversely of the cables to effect operation of said tightener means.

16. A cable tension regulator comprising a pulley engaging the cable, a yoke in which said pulley is journaled, a reaction member, a spring reacting between said yoke and said reaction member urging said yoke generally transversely of the cable engaged by said pulley to deflect the cable in opposition to the cable tension, a tightener movable to effect a cable slackening operation, tightener drive means operable upon movement of said pulley accompanying a decrease in such cable deflection to effect such movement of said tightener, and means operable to limit movement of said pulley in a direction to reduce the deflection of the cable stretch upon breaking of said spring, thereby to terminate cable slackening movement of said tightener drive means.

ROBERT J. HELBERG.